United States Patent
Kim

(10) Patent No.: US 12,494,241 B2
(45) Date of Patent: Dec. 9, 2025

(54) SEMICONDUCTOR DEVICES FOR CALIBRATING PHASE OF DIVISION CLOCK

(71) Applicant: SK hynix Inc., Icheon-si (KR)

(72) Inventor: Chang Hyun Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 143 days.

(21) Appl. No.: 18/493,566

(22) Filed: Oct. 24, 2023

(65) Prior Publication Data

US 2024/0404573 A1 Dec. 5, 2024

(30) Foreign Application Priority Data

May 30, 2023 (KR) .................. 10-2023-0069513

(51) Int. Cl.
*G11C 7/22* (2006.01)
*G11C 8/18* (2006.01)

(52) U.S. Cl.
CPC ..................... *G11C 8/18* (2013.01)

(58) Field of Classification Search
CPC ....................................................... G11C 7/222
See application file for complete search history.

(56) References Cited

U.S. PATENT DOCUMENTS

| | | |
|---|---|---|
| 2019/0086949 A1 | 3/2019 | Kamiya et al. |
| 2022/0319563 A1* | 10/2022 | Kim .................... G11C 8/18 |
| 2022/0368351 A1* | 11/2022 | Jeong ............. H03M 13/1575 |

FOREIGN PATENT DOCUMENTS

KR 1020090030164 A 3/2009

* cited by examiner

*Primary Examiner* — Hoai V Ho
(74) *Attorney, Agent, or Firm* — WILLIAM PARK AND ASSOCIATES LTD.

(57) ABSTRACT

A semiconductor device includes a command decoder configured to generate a block command, based on a command address, and a clock division circuit configured to divide an internal clock and an inverted internal clock to generate division clocks. In the present disclosure, the clock division circuit is configured to stop generating the division clocks for a block section when the block command is generated.

19 Claims, 8 Drawing Sheets

SEMICONDUCTOR DEVICES FOR CALIBRATING PHASE OF DIVISION CLOCK

CROSS-REFERENCE TO RELATED APPLICATIONS

The present application claims priority under 35 U.S.C. § 119 (a) to Korean Patent Application No. 10-2023-0069513, filed in the Korean Intellectual Property Office on May 30, 2023, which is incorporated herein by reference in its entirety.

BACKGROUND

1. Technical Field

Embodiments of the present disclosure relate to semiconductor devices for calibrating the phase of a division clock.

2. Related Art

Recently, the semiconductor devices divide a clock to generate division clocks for high-speed operation, and input/output data in synchronization with the division clocks. However, in a semiconductor device, when generation of the division clocks is interrupted due to a self-refresh operation or the like and then the division clocks are generated again, the phases of the division clocks may be flipped, resulting in errors in a data input/output operation.

SUMMARY

The present disclosure may provide a semiconductor device including a command decoder configured to generate a block command, based on a command address, and a clock division circuit configured to divide an internal clock and an inverted internal clock to generate division clocks. In the present disclosure, the clock division circuit may be configured to stop generating the division clocks for a block section when the block command is generated.

In addition, the present disclosure may provide a semiconductor device including a clock latch circuit configured to latch an internal clock and an inverted internal clock, based on a block control pulse to generate a first division clock, a second division clock, a third division clock, a fourth division clock, and a latch clock, and a block control pulse generating circuit configured to sequentially latch a block command, based on the third division clock and the latch clock to generate the block control pulse. In the present disclosure, the clock latch circuit may be configured to stop generating the first division clock, the second division clock, the third division clock, and the fourth division clock for a block section in which the block control pulse is generated.

DETAILED DESCRIPTION OF THE EMBODIMENTS

Figure 1:
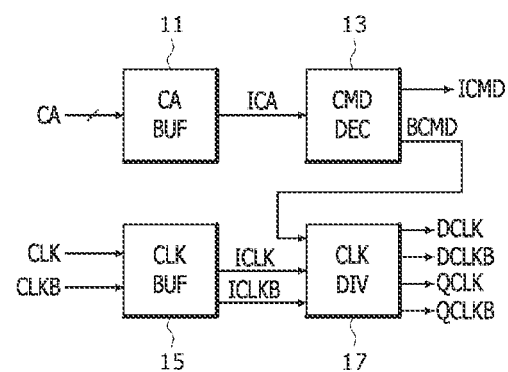
FIG. 1 is a block diagram illustrating a configuration of a semiconductor device according to an embodiment of the present disclosure.

In the following description of embodiments, when a parameter is referred to as being "predetermined," it means that a value of the parameter is determined in advance of or prior to when the parameter is used in a process or an algorithm. The value of a predetermined parameter may be set when the process or the algorithm starts, or it may be set during a period that the process or the algorithm is executed. And if the terms "first," "second," "third," etc. are used herein to identify various elements, those elements should not be limited by those terms. The terms "first," "second," "third" and so forth, are only used to distinguish one element from another element and are not intended to require or imply an order or number of elements. Thus, a first element in some embodiments could be termed a second element in other embodiments without departing from the teachings of the present disclosure.

Furthermore, when an element is referred to as being "connected" or "coupled" to another element, it can be directly or indirectly connected or coupled to the other element. One or more intervening elements may or may not be between elements that are connected or coupled to each other. On the other hand, when an element is referred to as being "directly connected" or "directly coupled" to another element, there are no intervening elements present.

A logic "high" level and a logic "low" level may be used to describe logic levels of electric signals. A signal having a logic "high" level may be distinguished from a signal having a logic "low" level. For example, when a signal having a first voltage that corresponds to a signal having a logic "high" level, a signal having a second voltage correspond to a signal having a logic "low" level. In an embodiment, the logic "high" level may be set as a voltage level which is higher than a voltage level of the logic "low" level. Meanwhile, logic levels of signals may be set to be different or opposite according to the embodiments. For example, a certain signal having a logic "high" level in one embodiment may be set to a logic "low" level in another embodiment.

The term "logic bit set" may mean a combination of logic levels of bits included in a signal. When the logic level of each of the bits included in the signal is changed, the logic bit set of the signal may be set differently. For example, when the signal includes 2 bits, when the logic level of each of the 2 bits included in the signal is "logic low level, logic low level", the logic bit set of the signal may be set as the first logic bit set, and when the logic level of each of the two bits included in the signal is "a logic low level and a logic high level", the logic bit set of the signal may be set as the second logic bit set.

Those of ordinary skill in the art know that the term "buffer" can be as noun and verb. The noun form of "buffer" refers to a device or storage area used to store data temporarily, to compensate for differences in rates of data flow, time of occurrence of events, or amounts of data that can be handled by the devices or processes involved in the transfer or use of the data. The verb form of "buffer" refers to a routine or method, which accomplishes the objectives of the noun form of buffer.

Various embodiments of the present disclosure will be described hereinafter in more detail with reference to the accompanying drawings. However, the embodiments described herein are for illustrative purposes only and are not intended to limit the scope of the present disclosure.

FIG. 1 is a block diagram illustrating a configuration of a semiconductor device 1 according to an embodiment of the present disclosure. As shown in FIG. 1, the semiconductor device 1 may include a command address buffer (CA BUF) 11, a command decoder (CMD DEC) 13, a clock buffer (CLK BUF) 15, and a clock division circuit (CLK DIV) 17.

The command address buffer 11 may generate an internal command address ICA, based on a command address CA. The command address CA may be supplied from a controller (31 of FIG. 6). The command address buffer 11 may buffer the command address CA to generate the internal command address ICA. The command address buffer 11 may be connected to the command decoder 13 to supply the internal command address ICA to the command decoder 13.

The command decoder 13 may generate an internal command ICMD and a block command BCMD, based on the internal command address ICA. The command decoder 13 may decode the internal command address ICA to generate the internal command ICMD and the block command BCMD. The internal command ICMD may be generated for performing various internal operations such as a read operation and a write operation. The block command BCMD may be generated for a clock flip operation of inverting the phases of internal division clocks DCLK, DCLKB, QCLK, and QCLKB. The command decoder 13 may be connected to the clock division circuit 17 to supply the block command BCMD to the clock division circuit 17.

The clock buffer 15 may generate an internal clock ICLK and an inverted internal clock ICLKB, based on a clock CLK and an inverted clock CLKB. The clock CLK and the inverted clock CLKB may be supplied from the controller (31 of FIG. 6). The clock buffer 15 may buffer the clock CLK and the inverted clock CLKB to generate the internal clock ICLK and the inverted internal clock ICLKB. The clock buffer 15 may be connected to the clock division circuit 17 to supply the internal clock ICLK and the inverted internal clock ICLKB to the clock division circuit 17.

The clock division circuit 17 may generate the internal division clocks DCLK, DCLKB, QCLK, and QCLKB, based on the block command BCMD, the internal clock ICLK, and the inverted internal clock ICLKB. The clock division circuit 17 may generate the internal division clocks DCLK, DCLKB, QCLK, and QCLKB in synchronization with the internal clock ICLK and the inverted internal clock ICLKB when the block command BCMD is not generated. The clock division circuit 17 may stop the generation operation of the internal division clocks DCLK, DCLKB, QCLK, and QCLKB for a preset block section to perform a clock flip operation for inverting or flipping the phases of the internal division clocks DCLK, DCLKB, QCLK, and QCLKB when the block command BCMD is generated while the internal division clocks DCLK, DCLKB, QCLK, and QCLKB are being generated.

Figure 2:
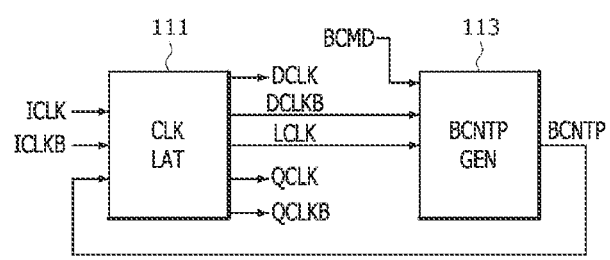
FIG. 2 is a block diagram illustrating a configuration according to an example of a clock division circuit included in the semiconductor device shown in FIG. 1.

FIG. 2 is a block diagram illustrating a configuration of a clock division circuit 17A according to an example of the clock division circuit 17 shown in FIG. 1. As shown in FIG. 2, the clock division circuit 17A may include a clock latch circuit (CLK LAT) 111 and a block control pulse generating circuit (BCNTP GEN) 113.

The clock latch circuit 111 may generate the internal division clocks DCLK, DCLKB, QCLK, and QCLKB, based on a block control pulse BCNTP, the internal clock ICLK, and the inverted internal clock ICLKB. The clock latch circuit 111 may generate a latch clock LCLK, and the internal division clocks DCLK, DCLKB, QCLK, and QCLKB, based on the internal clock ICLK and the inverted internal clock ICLKB when the block control pulse BCNTP is not generated. The clock latch circuit 111 may stop the operation of generating the internal division clocks DCLK, DCLKB, QCLK, and QCLKB, based on the internal clock ICLK and the inverted internal clock ICLKB when the block control pulse BCNTP is generated. The internal division clocks DCLK, DCLKB, QCLK, and QCLKB may include the first internal division clock DCLK, the second internal division clock QCLK, the third internal division clock DCLKB, and the fourth internal division clock QCLKB. Because each of the first internal division clock DCLK, the second internal division clock QCLK, the third internal division clock DCLKB, and the fourth internal division clock QCLKB may be generated by frequency-dividing the internal clock ICLK and the inverted internal clock ICLKB, each of the first internal division clock DCLK, the second internal division clock QCLK, the third internal division clock DCLKB, and the fourth internal division clock QCLKB may be set to have a cycle twice as large as the cycle of the internal clock ICLK and the inverted internal clock ICLKB. A phase difference between the first internal division clock DCLK and the second internal division clock QCLK may be set to a half cycle period of the internal clock ICLK, and a phase difference between the third internal division clock DCLKB and the fourth internal division clock QCLKB may be set to a half cycle period of the internal clock ICLK. Because a phase difference between the first internal division clock DCLK and the third internal division clock DCLKB is set to one cycle period of the internal clock ICLK, the first internal division clock DCLK and the third internal division clock DCLKB may be set to have phases inverted from each other. Because a phase difference between the second internal division clock QCLK and the fourth internal division clock QCLKB is set to one cycle period of the internal clock ICLK, the second internal division clock QCLK and the fourth internal division clock QCLKB may be set to have phases inverted from each other. The clock latch circuit 111 may be connected to the block control pulse generating circuit 113 to supply the third internal division clock DCLKB and the latch clock LCLK to the block control pulse generating circuit 113.

The block control pulse generating circuit 113 may generate the block control pulse BCNTP, based on the block command BCMD, the third internal division clock DCLKB, and the latch clock LCLK. The block control pulse generating circuit 113 may sequentially latch the block command BCMD, based on the third internal division clock DCLKB and the latch clock LCLK to generate the block control pulse BCNTP when the block command BCMD is generated. The block control pulse generating circuit 113 may be connected to the clock latch circuit 111 to supply the block control pulse BCNTP to the clock latch circuit 111.

Figure 3:
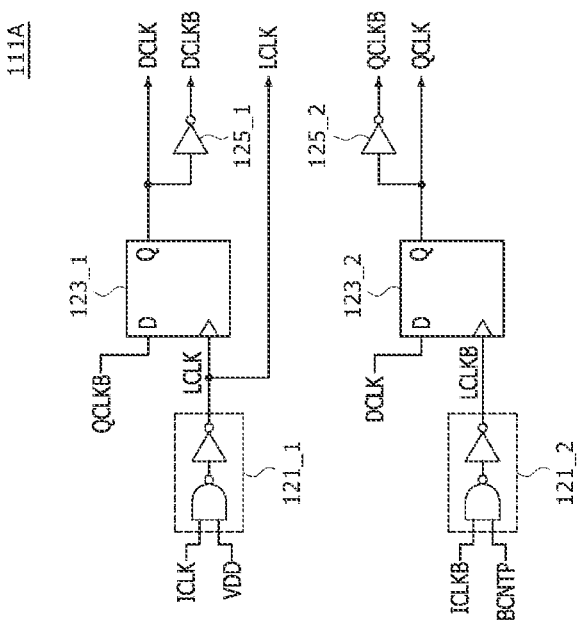
FIG. 3 is a circuit diagram according to an example of a clock latch circuit included in the clock division circuit shown in FIG. 2.

FIG. 3 is a circuit diagram of a clock latch circuit 111A according to an example of the clock latch circuit 111 shown in FIG. 2. As shown in FIG. 3, the clock latch circuit 111A may include a latch clock generating circuit 121_1, a first latch 123_1, a first inversion buffer 125_1, an inverted latch clock generating circuit 121_2, a second latch 123_2, and a second inversion buffer 125_2.

The latch clock generating circuit 121_1 may receive the internal clock ICLK and a supply voltage VDD to perform an AND operation. The latch clock generating circuit 121_1 may buffer the internal clock ICLK to generate the latch clock LCLK. The latch clock generating circuit 121_1 may be connected to the first latch 123_1 to supply the latch clock LCLK to the first latch 123_1.

The first latch 123_1 may generate the first internal division clock DCLK, based on the latch clock LCLK and the fourth internal division clock QCLKB. The first latch 123_1 may latch the fourth internal division clock QCLKB in synchronization with the latch clock LCLK, and output the latched fourth internal division clock QCLKB as the first internal division clock DCLK. The first latch 123_1 may be implemented with a D flip-flop.

The first inversion buffer 125_1 may be connected to the first latch 123_1 to receive the first internal division clock DCLK from the first latch 123_1. The first inversion buffer 125_1 may inversely buffer the first internal division clock DCLK to generate the third internal division clock DCLKB.

The inverted latch clock generating circuit 121_2 may receive the inverted internal clock ICLKB and the block control pulse BCNTP to perform an AND operation. The inverted latch clock generating circuit 121_2 may buffer the inverted internal clock ICLKB to generate an inverted latch clock LCLKB when the block control pulse BCNTP is not generated and set to a logic "high" level. The inverted latch clock generating circuit 121_2 may generate the inverted latch clock LCLKB set to a logic "low" level, regardless of the inverted internal clock ICLKB when the block control pulse BCNTP is generated at a logic "low" level. The inverted latch clock generating circuit 121_2 may be connected to the second latch 123_2 to supply the inverted latch clock LCLKB to the second latch 123_2.

The second latch 123_2 may generate the second internal division clock QCLK, based on the inverted latch clock LCLKB and the first internal division clock DCLK. The second latch 123_2 may latch the first internal division clock DCLK in synchronization with the inverted latch clock LCLKB, and output the latched first internal division clock DCLK as the second internal division clock QCLK. The second latch 123_2 may be implemented with a D flip-flop.

The second inversion buffer 125_2 may be connected to the second latch 123_2 to receive the second internal division clock QCLK from the second latch 123_2. The second inversion buffer 125_2 may inversely buffer the second internal division clock QCLK to generate the fourth internal division clock QCLKB.

When the block control pulse BCNTP is not generated and the block control pulse BCNTP set to a logic "high" level is received, because the inverted latch clock generating circuit 121_2 may buffer the inverted internal clock ICLKB to generate the inverted latch clock LCLKB, the second latch 123_2 may latch the first internal division clock DCLK generated in the first latch 123_1 in synchronization with the inverted latch clock LCLKB, and output the latched first internal division clock DCLK as the second internal division clock QCLK. The second inversion buffer 125_2 may inversely buffer the second internal division clock QCLK to generate the fourth internal division clock QCLKB. In this case, because the latch clock generating circuit 121_1 may buffer the internal clock ICLK to generate the latch clock LCLK, the first latch 123_1 may latch the fourth internal division clock QCLKB in synchronization with the latch clock LCLK, and output the latched fourth internal division clock QCLKB as the first internal division clock DCLK. The first inversion buffer 125_1 may inversely buffer the first internal division clock DCLK to generate the third internal division clock DCLKB.

Because the inverted latch clock generating circuit 121_2 generates the inverting latch clock LCLKB that does not toggle and is set at a logic "low" level when the block control pulse BCNTP is generated at a logic "low" level, the second latch 123_2 may stop the operation of latching the first internal division clock DCLK generated in the first latch 123_1. Because the second internal division clock QCLK and the fourth internal division clock QCLKB do not toggle when the latch operation of the first latch 123_1 is stopped, the first internal division clock DCLK generated in the first latch 123_1 and the third internal division clock DCLKB output from the first inversion buffer 125_1 may also maintain their respective logic levels without being toggled. Because the latch operation of the second latch 123_2 is stopped during the block section in which the block control pulse BCNTP is generated at a logic "low" level, each of the first internal division clock DCLK, the second internal division clock QCLK, the third internal division clock DCLKB, and the fourth internal division clock QCLKB might not toggle, and the logic level of each of the first internal division clock DCLK, the second internal division clock QCLK, the third internal division clock DCLKB, and the fourth internal division clock QCLKB may be maintained.

Figure 4:
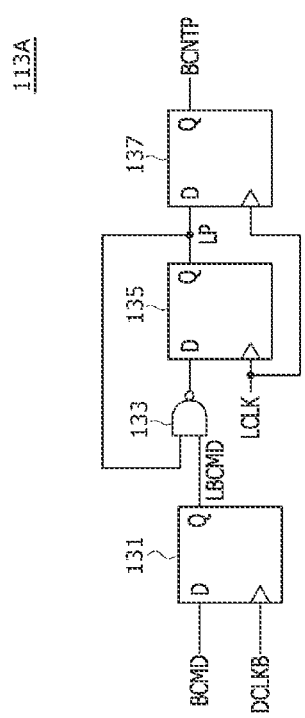
FIG. 4 is a circuit diagram according to an example of a block control pulse generating circuit included in the clock division circuit shown in FIG. 2.

FIG. 4 is a circuit diagram of a block control pulse generating circuit 113A according to an example of the block control pulse generating circuit 113 shown in FIG. 2. As shown in FIG. 4, the block control pulse generating circuit 113A may include a command latch 131, a command transfer control circuit 133, a latch pulse generating circuit 135, and a pulse latch circuit 137.

The command latch 131 may generate a latch block command LBCMD from the block command BCMD, based on the third internal division clock DCLKB. The command latch 131 may latch the block command BCMD in synchronization with the third internal division clock DCLKB, and output the latched block command BCMD as the latch block command LBCMD. The command latch 131 may latch the block command BCMD in synchronization with the third internal division clock DCLKB to generate the latch block command LBCMD set to a logic "high" level when the block command BCMD is generated at a logic "high" level for the clock flip operation. The command latch 131 may be connected to the command transfer control circuit 133 to supply the latch block command LBCMD to the command transfer control circuit 133.

The command transfer control circuit 133 may be connected to the latch pulse generating circuit 135 to receive a latch pulse LP from the latch pulse generating circuit 135. The command transfer control circuit 133 may transfer the latch block command LBCMD to the latch pulse generating circuit 135, based on the latch pulse LP. The command transfer control circuit 133 may transfer the latch block command LBCMD to the latch pulse generating circuit 1335 when the latch pulse LP set to a logic "high" level is received. The command transfer control circuit 133 may block the transfer of the latch block command LBCMD and transfer a signal of a logic "high" level to the latch pulse generating circuit 135 when the latch pulse LP set to a logic "low" level is received.

The latch pulse generating circuit 135 may generate the latch pulse LP, based on the latch clock LCLK and a signal transferred from the command transfer control circuit 133. The latch pulse generating circuit 135 may latch the signal transferred from the command transfer control circuit 133 and generate the latch pulse LP in synchronization with the latch clock LCLK. When the block command BCMD is not generated and the block command BCMD set to a logic "low" level is received, the latch block command LBCMD set to a logic "low" level may be generated and the command transmission control circuit 133 may output a signal of a logic "high" level. Accordingly, the latch pulse generating circuit 135 may latch the signal of a logic "high" level received from the command transmission control circuit 133 in synchronization with the latch clock LCLK to generate the latch pulse LP set to a logic "high" level. When the block command BCMD is generated and the block command BCMD set to a logic "high" level is received while the latch pulse LP set to a logic "high" level is received, a signal of a logic "low" level may be output from the command transmission control circuit 133. Accordingly, the latch pulse generating circuit 135 may latch the signal of a logic "low" level received from the command transmission control circuit 133 in synchronization with the latch clock LCLK to output the latch pulse LP set to a logic "low" level. Because the signal of a logic "high" level is output from the command transmission control circuit 133 in a state in which the latch pulse LP set to a logic "low" level is received, the latch pulse generating circuit 135 may latch the signal of a logic "high" level received from the command transmission control circuit 133 in synchronization with the latch clock LCLK to output the latch pulse LP set to a logic "high" level. The latch pulse generating circuit 135 may be connected to the pulse latch circuit 137 to supply the latch pulse LP to the pulse latch circuit 137.

The pulse latch circuit 137 may generate the block control pulse BCNTP, based on the latch clock LCLK and the latch pulse LP. The pulse latch circuit 137 may latch the latch pulse LP in synchronization with the latch clock LCLK, and output the latched latch pulse LP as the block control pulse BCNTP.

The block control pulse generating circuit 113A may set the latch pulse LP to a logic "high" level and might not generate the block control pulse BCNTP when the block command BCMD is not generated and the block command BCMD set to a logic "low" level is received. The block control pulse generating circuit 113A may sequentially latch the block command BCMD in synchronization with the third internal division clock DCLKB and the latch clock LCLK to generate the block control pulse BCNTP set to a logic "low" level when the block command BCMD is generated at a logic "high" level.

Figure 5:
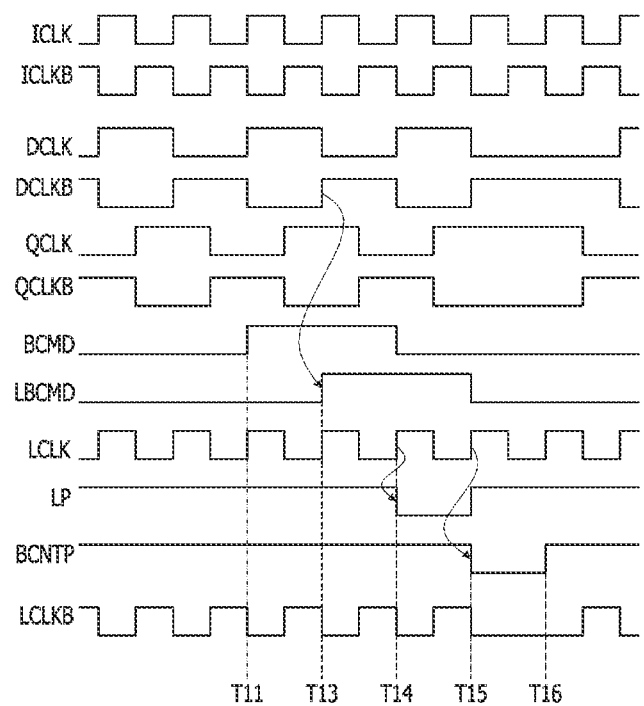
FIG. 5 is a timing diagram illustrating an operation of a semiconductor device according to an embodiment of the present disclosure.

FIG. 5 is a timing diagram illustrating an operation of the semiconductor device 1 shown in FIGS. 1 to 4.

As shown in FIGS. 4 and 5, because the block command BCMD set to a logic "low" level is received in the section before a time point T11 in which the block command BCMD is not generated, the block control pulse generating circuit 113A may set the latch pulse LP to a logic "high" level and not generate the block control pulse BCNTP.

As shown in FIGS. 4 and 5, when the block command BCMD is generated at a logic "high" level at the time point T11, the block control pulse generating circuit 113A may latch the block command BCMD in synchronization with the third internal division clock DCLKB at a time point T13 to set the latch block command LBCMD to a logic "high" level, and latch the latch block command LBCMD in synchronization with the latch clock LCLK at a time point T14 to generate the latch pulse LP at a logic "low" level. The block control pulse generating circuit 113A may latch the latch pulse LP in synchronization with the latch clock LCLK at a time point T15 to generate the block control pulse BCNTP at a logic "low" level.

As shown in FIGS. 3 and 5, because the latch operation of the second latch 123_2 is stopped during the section T15~T16 in which the block control pulse BCNTP is generated at a logic "low" level, each of the first internal division clock DCLK, the second internal division clock QCLK, the third internal division clock DCLKB, and the fourth internal division clock QCLKB might not toggle and maintain respective logic level.

As shown in FIGS. 3 and 5, in the section after a time point T16, the latch operation of the second latch 123_2 may be performed again by the block control pulse BCNTP set to a logic "high" level, and the flipped first internal division clock DCLK, second internal division clock QCLK, third internal division clock DCLKB, and fourth internal division clock QCLKB may be generated.

As described above, the semiconductor device 1 may provide a clock flip operation capable of flipping the phases of the first internal division clock DCLK, the second internal division clock QCLK, the third internal division clock DCLKB, and the fourth internal division clock QCLKB. Accordingly, the phases of the first internal division clock DCLK, the second internal division clock QCLK, the third internal division clock DCLKB, and the fourth internal division clock QCLKB may be easily calibrated.

Figure 6:
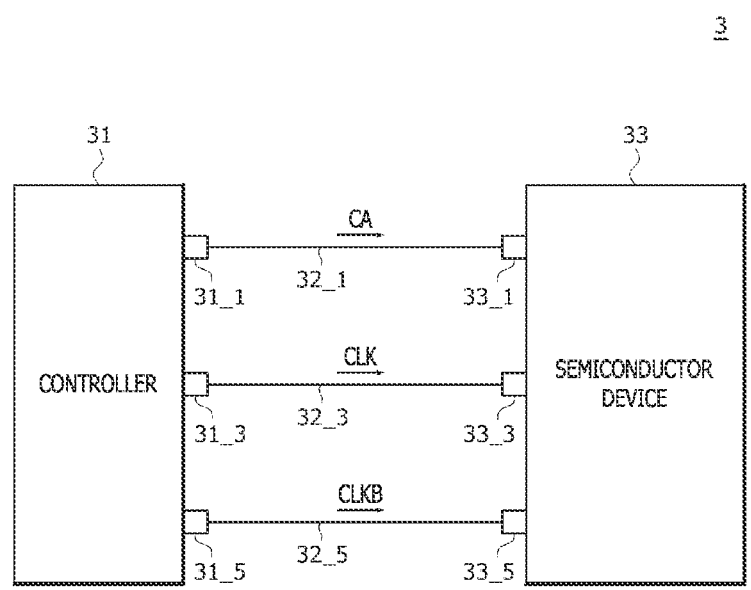
FIG. 6 is a block diagram illustrating a configuration of a semiconductor system according to an embodiment of the present disclosure.

FIG. 6 is a block diagram illustrating a configuration of a semiconductor system 3 according to an embodiment of the present disclosure. As shown in FIG. 6, the semiconductor system 3 may include a controller 31 and a semiconductor device 33.

The controller 31 may include a first control pin 31_1, a second control pin 31_3, and a third control pin 31_5. The semiconductor device 33 may include a first device pin 33_1, a second device pin 33_3, and a third device pin 33_5. The controller 31 may transmit a command address CA to the semiconductor device 33 through a first transmission line 32_1 connected between the first control pin 31_1 and the first device pin 33_1. In this embodiment, the command address CA may include a command and an address, but this is only an example and is not limited thereto. Each of the first control pin 31_1, the first transmission line 32_1, and the first device pin 33_1 may be implemented in plurality according to the number of bits of the command address CA. The controller 31 may apply a clock CLK to the semiconductor device 33 through a second transmission line 32_3 connected between the second control pin 31_3 and the second device pin 33_3. The controller 31 may apply an inverted clock CLKB to the semiconductor device 33 through a third transmission line 32_5 connected between the third control pin 31_5 and the third device pin 33_5.

The semiconductor device 33 may stop the generation operation of the internal frequency division clocks (DCLK, DCLKB, QCLK, and QCLKB in FIG. 1) for a preset block section when the block command BCMD is generated from the command address CA while the internal frequency division clocks (DCLK, DCLKB, QCLK, QCLKB in FIG. 1) are generated from the clock CLK and the inverted clock CLKB to perform a clock flip operation for inverting or flipping the phases of the internal frequency division clocks (DCLK, DCLKB, QCLK, and QCLKB in FIG. 1).

Figure 7:
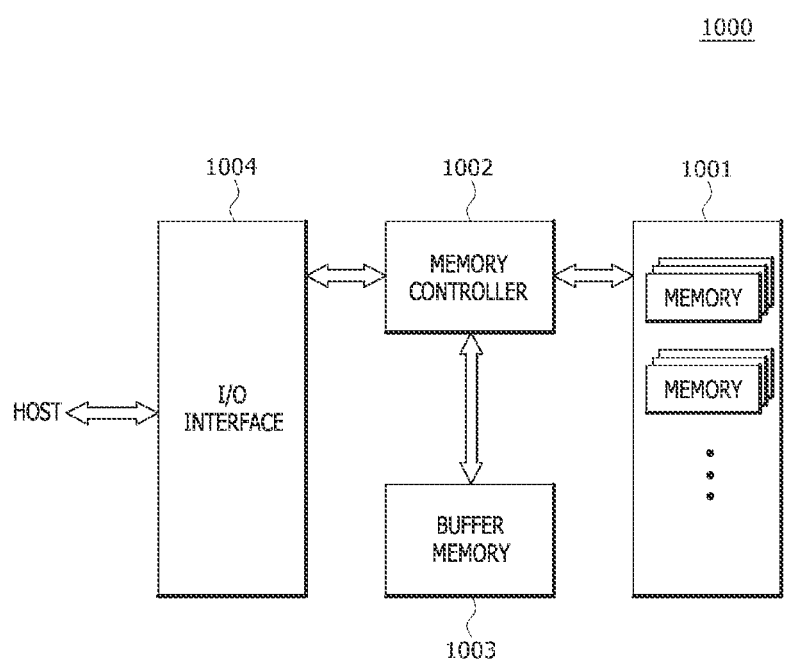
FIG. 7 is a block diagram illustrating a configuration of an electronic system according to an embodiment of the present disclosure.

The semiconductor device 1 described with reference to FIG. 1 and the semiconductor device 33 described with reference to FIG. 6 may be applied to an electronic system including a memory system, a graphic system, a computing system, and a mobile system. For example, FIG. 7 is a block diagram illustrating a configuration of an electronic system 1000 according to an embodiment of the present disclosure. Referring to FIG. 7, the electronic system 1000 according to an embodiment of the present disclosure may include a data storage unit 1001, a memory controller 1002, a buffer memory device 1003, and an input/output interface 1004.

The data storage unit 1001 may store data (not shown) applied from the memory controller 1002 according to a control signal from the memory controller 1002, and read the stored data (not shown) to output the data to the memory controller 1002. The data storage unit 1001 may include a non-volatile memory device capable of continuously storing data without loss even when power is cut off. The non-volatile memory device may be implemented with a flash memory (NAND flash memory) device, a phase change random access memory (PRAM) device, a resistive random access memory (RRAM) device, a spin transfer torque random access memory (STTRAM) device, and a magnetic random access memory (MRAM) device.

The memory controller 1002 may decode instructions applied from an external device (host device) through the input/output interface 1004, and control data input/output to the data storage unit 1001 and the buffer memory 1003 according to a result of decoding. In FIG. 7, the memory controller 1002 is shown as one functional block, however, the memory controller 1002 may include a first controller for controlling the data storage unit 1001 and a second controller for controlling the buffer memory device 1003, which may be one or more volatile memory devices, each of which may be configured independently and differently. The memory controller 1002 may include the controller 31 described with reference to FIG. 6.

The buffer memory device 1003 may temporarily store data to be processed by the memory controller 1002, that is, data input and output to the data storage unit 1001 (not shown). The buffer memory device 1003 may store data (not shown) applied from the memory controller 1002 according to a control signal. The buffer memory device 1003 may include the semiconductor device 1 described with reference to FIG. 1 and the semiconductor device 33 described with reference to FIG. 6. The buffer memory device 1003 may read the stored data, and output the data to the memory controller 1002. The buffer memory device 1003 may include a volatile memory device such as a dynamic random access memory (DRAM) device, a mobile DRAM device, and a static random access memory (SRAM) device.

The input/output interface 1004 may provide a physical connection between the memory controller 1002 and an external device (host) to allow the memory controller 1002 to receive the control signal for data input/output from the external device and to exchange data with the external device. The input/output interface 1004 may include one of a variety of interface protocols such as USB, MMC, PCI-E, SAS, SATA, PATA, SCSI, ESDI, and IDE.

The electronic system 1000 may be used as an auxiliary storage device or an external storage device of the host device. The electronic system 1000 may include a solid state disk (SSD), a universal serial bus memory (USB memory) device, a secure digital card (SD), a mini secure digital card (mSD), a micro secure digital card (micro SD), secure digital high capacity (SDHC), a memory stick card, a smart media card (SM), a multi-media card (MMC), an embedded multi-media card (embedded MMC; eMMC), a compact flash card (CF), and the like.

Figure 8:
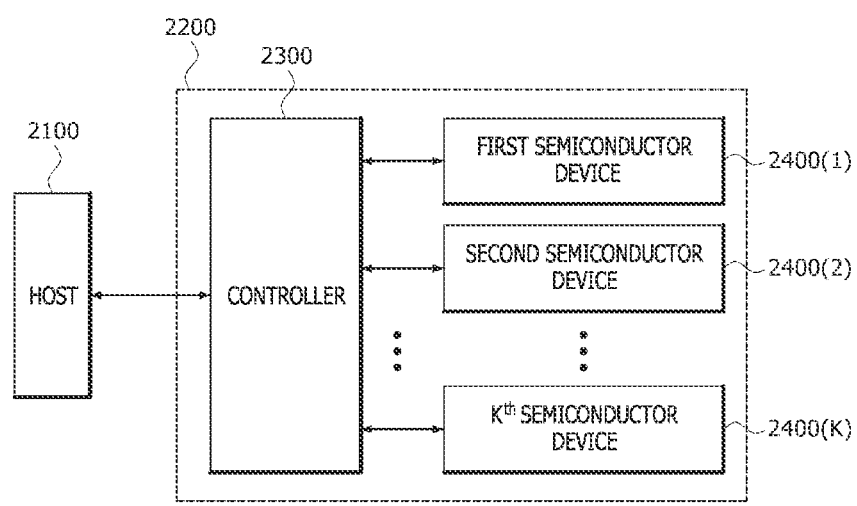
FIG. 8 is a block diagram illustrating a configuration of an electronic system according to another embodiment of the present disclosure.

FIG. 8 is a block diagram illustrating a configuration of an electronic system 2000 according to another embodiment of the present disclosure. As shown in FIG. 8, the electronic system 2000 may include a host 2100 and a semiconductor system 2200.

The host 2100 and the semiconductor system 2200 may transmit signals to each other using an interface protocol. The interface protocol used between the host 2100 and the semiconductor system 2200 may include a multi-media card (MMC), enhanced small disk interface (ESDI), integrated drive electronics (IDE), peripheral component interconnect-express (PCI-E), advanced technology attachment (ATA), serial ATA (SATA), parallel ATA (PATA), serial attached SCSI (SAS), universal serial bus (USB), and the like.

The semiconductor system 2200 may include a controller 2300 and semiconductor devices 2400(1:K). Each of the semiconductor devices 2400(1:K) may stop the generation operation of the internal division clocks (DCLK, DCLKB, QCLK, and QCLKB of FIG. 1) for a preset block section to perform the clock flip operation of inverting the phases of the internal frequency division clocks (DCLK, DCLKB, QCLK, and QCLKB of FIG. 1).

The controller 2300 may include the controller 31 described with reference to FIG. 6. Each of the semiconductor devices 2400(1:K) may include the semiconductor device 1 described with reference to FIG. 1 and the semiconductor device 33 described with reference to FIG. 6. Each of the semiconductor devices 2400(1:K) may be implemented with one of a dynamic random access memory (DRAM) device, a phase change random access memory (PRAM) device, a resistive random access memory (RRAM) device, a magnetic random access memory (MRAM) device, and a ferroelectric random access memory (FRAM) device.

Concepts have been disclosed in conjunction with some embodiments as described above. Those skilled in the art will appreciate that various modifications, additions, and substitutions are possible, without departing from the scope and spirit of the present disclosure. Accordingly, the embodiments disclosed in the present specification should be considered from not a restrictive standpoint but rather from an illustrative standpoint. The scope of the concepts is not limited to the above descriptions but defined by the accompanying claims, and all of distinctive features in the equivalent scope should be construed as being included in the concepts.

What is claimed is:

1. A semiconductor device comprising:
   a command decoder configured to generate a block command, based on a command address; and
   a clock division circuit configured to divide an internal clock and an inverted internal clock to generate division clocks,
   wherein the clock division circuit includes a clock latch circuit configured to latch the internal clock and the inverted internal clock, based on a block control pulse to generate the division clocks and a latch clock; and a block control pulse generating circuit configured to sequentially latch the block command, based on at least one of the division clocks and the latch clock to generate the block control pulse.

2. The semiconductor device of claim 1, wherein the command decoder receives the command address from a controller.

3. The semiconductor device of claim 1 wherein the division clocks generated in the clock division circuit includes a first division clock, a second division clock, a third division clock, and a fourth division clock.

4. The semiconductor device of claim 3, wherein the clock division circuit configured to generate the first division clock, the second division clock, the third division clock, and the fourth division clock, each of the first to fourth division clocks being set to have a period twice larger than a period of the internal clock.

5. The semiconductor device of claim 4, wherein the clock division circuit is configured to:
generate the first division clock and the third division clock set to have inverted phases from each other; and
generate the second division clock and the fourth division clock set to have inverted phases from each other.

6. The semiconductor device of claim 3, wherein the clock division circuit is configured to latch the fourth division clock in synchronization with a latch clock generated by buffering the internal clock, and to output the latched fourth division clock as the first division clock.

7. The semiconductor device of claim 6, wherein the clock division circuit further includes an inversion buffer configured to inversely buffer the first division clock to generate the third division clock.

8. The semiconductor device of claim 6, wherein the clock division circuit includes:
an inverted latch clock generating circuit configured to buffer the inverted internal clock, based on the block control pulse to generate an inverted latch clock; and
a second latch configured to latch the first division clock in synchronization with the inverted latch clock, and to output the latched first division clock as the second division clock.

9. The semiconductor device of claim 8, wherein the clock division circuit further includes an inversion buffer configured to inversely buffer the second division clock to generate the fourth division clock.

10. The semiconductor device of claim 3, wherein the block control pulse generating circuit is configured to latch the block command in synchronization with the third division clock to generate a latch block command.

11. The semiconductor device of claim 10, wherein the block control pulse generating circuit further includes:
a command transmission control circuit configured to control transmission of the latch block command, based on a latch pulse; and
a latch pulse generating circuit configured to latch an output signal of the command transmission control circuit in synchronization with the latch clock to generate the latch pulse.

12. The semiconductor device of claim 11, wherein the block control pulse generating circuit further includes a pulse latch circuit configured to latch the latch pulse in synchronization with the latch clock to generate the block control pulse.

13. A semiconductor device comprising:
a clock latch circuit configured to latch an internal clock and an inverted internal clock, based on a block control pulse to generate a first division clock, a second division clock, a third division clock, a fourth division clock, and a latch clock; and
a block control pulse generating circuit configured to sequentially latch a block command, based on the third division clock and the latch clock to generate the block control pulse,
wherein the clock latch circuit is configured to stop generating the first division clock, the second division clock, the third division clock, and the fourth division clock for a block section in which the block control pulse is generated.

14. The semiconductor device of claim 13, wherein the clock latch circuit includes a first latch configured to latch the fourth division clock in synchronization with a latch clock generated by buffering the internal clock, and to output the latched fourth division clock as the first division clock.

15. The semiconductor device of claim 14, wherein the clock latch circuit further includes an inversion buffer configured to inversely buffer the first division clock to generate the third division clock.

16. The semiconductor device of claim 14, wherein the clock latch circuit further includes:
an inverted latch clock generating circuit configured to buffer the inverted internal clock in synchronization with the block control pulse to generate an inverted latch clock; and
a second latch configured to latch the first division clock in synchronization with the inverted latch clock, and to output the latched first division clock as the second division clock.

17. The semiconductor device of claim 16, wherein the clock latch circuit further includes an inversion buffer configured to inversely buffer the second division clock to generate the fourth division clock.

18. The semiconductor device of claim 13, wherein the block control pulse generating circuit includes a command latch configured to latch the block command in synchronization with the third division clock to generate a latch block command.

19. The semiconductor device of claim 18, wherein the block control pulse generating circuit further includes:
a command transmission control circuit configured to control transmission of the latch block command, based on a latch pulse;
a latch pulse generating circuit configured to latch an output signal of the command transmission control circuit in synchronization with the latch clock to generate the latch pulse; and
a pulse latch circuit configured to latch the latch pulse in synchronization with the latch clock to generate the block control pulse.

* * * * *